United States Patent
Liao et al.

(10) Patent No.: US 6,824,716 B2
(45) Date of Patent: Nov. 30, 2004

(54) PROCESS FOR PRODUCING POROUS POLYMER MATERIALS

(75) Inventors: Chun-Jen Liao, Taipei (TW); Yu-Ju Lin, Ilan (TW); Chin-Fu Chen, Taipei (TW); Ken-Yuan Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 39 days.

(21) Appl. No.: 10/241,440

(22) Filed: Sep. 12, 2002

(65) Prior Publication Data

US 2003/0116877 A1 Jun. 26, 2003

(30) Foreign Application Priority Data

Dec. 21, 2001 (TW) ........................................ 90131931 A

(51) Int. Cl.[7] .............................................. B29C 67/20
(52) U.S. Cl. .......................................... 264/49; 264/344
(58) Field of Search ............................ 424/426; 264/49, 264/344

(56) References Cited

U.S. PATENT DOCUMENTS

| 4,252,756 A | * | 2/1981 | Riesberg, Jr. ................. 264/49 |
| 4,874,568 A | * | 10/1989 | Chau et al. .................... 264/49 |
| 4,892,544 A | * | 1/1990 | Frisch .......................... 128/898 |
| 6,436,426 B1 | * | 8/2002 | Liao et al. ................... 424/426 |

* cited by examiner

*Primary Examiner*—Allan Kuhns
(74) *Attorney, Agent, or Firm*—Sughrue Mion, PLLC

(57) ABSTRACT

A process for producing porous polymer material. The method combines a polymer and water-soluble granules to form a mixture. The mixture is placed into a mold; the surface of the polymer is dissolved to cause cohesion and form a polymer structure having water-soluble granules dispersed within, and water is introduced into the inner part of the polymer structure so that the polymer is solidified and water-soluble granules are washed out to obtain a porous polymer material. According to the invention, single or multiple layers of porous polymer material with different apertures, porosities, or made with different materials, are obtained by combining different polymer materials and water-soluble granules having different particle sizes in different weight ratios.

14 Claims, 5 Drawing Sheets

PROCESS FOR PRODUCING POROUS POLYMER MATERIALS

BACKGROUND OF THE INVENTION

1. Field of the Invention

The present invention relates to a method for producing porous polymer materials. In particular, the invention involves the formation of porous polymer materials used in biotechnology.

2. Description of the Prior Art

In recent years, the field of tissue engineering has evolved from the integration of biomedical material and the cultural technology of cell tissues followed by the continuous progress in biotechnology. One of the critical aspects in tissue engineering is to develop degradable porous substrate. To replace defective tissue, new cell tissues are adhered onto a porous polymer substrate, and new tissues grow in the three dimensional structure of the substrate. After cell tissues are cultivated, the porous material degrades gradually and is fully absorbed and replaced. Finally, the composite substrate comprising the implanted cells and polymer material replaces the original defects and become normal tissue. Since it is required to grow cells in the polymer material, the polymer material must be:

1. absorbable and degradable
2. highly and three-dimensionally porous
3. appropriately apertured
4. interconnectedly voided Presently, the absorbable polymer mostly valued by researchers is biodegradable polymer material, such as polyglycolic acid (PGA), polylactic acid (PLA), poly glycolide-co-lactide acid (PLGA), polycaprolactone, polydioxanone and polyorthoester. These materials can be degraded into small molecule segments and are released from the subject by metabolism. As a result, degraded products do not stay in the human body.

Following recent developments in tissue engineering, a number of processes for producing biodegradable porous polymer substrate have been proposed. However, there has not been a continuous process able to produce a multi-layer porous polymer material of different composition, with different apertures and porosities.

In current tissue engineering, a small part of healthy tissue of the patient or donor is collected and wholly cultivated in vitro, followed by implantation onto a degradable porous substrate. The implanted cell tissue adheres onto the three dimensional structure of the substrate and grows in it. After the tissue is cultivated, it is then implanted back to the patient as required. Arrangement and patterning of the cultivated tissues is determined by the structure of the three dimensional porous substrate. Current methods for producing porous substrate can produce a substrate with only one porosity or comprising only one type of material. However, human tissues are continuous and have multi-layered structures, which comprise substrates with different densities among tissues and different components. Hence, it is critical to develop a porous substrate with adjustable porosity, and comprising various compositions.

At the moment, methods for producing porous polymer material are:

1. solution casting
2. solvent-casting particulate leaching
3. gel casting
4. gas saturation
5. phase separation
6. bonded fiber
7. particle sintering Though the above methods produce various kinds of substrates with different porosities or apertures, they cannot continuously produce multi-layer substrates made from different material, and at the same time, have different porosities and apertures. As disclosed in U.S. Pat. No. 5,514,378, solvent-casting particulate leaching is used to produce two dimensional thin films of polymer material. Those thin films are then stacked to form a multi-layer three dimensional substrate. However, this method is limited due to problems such as irregular distribution of salt granules and polymer caused by differences in densities. Consequently, salt granules can be fully covered by polymer and organic solvents are likely to remain inside the substrate. Also, the thickness of produced substrate is limited to about 2000 $\mu$m. As a result, substrates must be stacked to produce thicker or three dimensional substrates. Although substrates with different apertures or porosities can be obtained by adding salt granules with different particle sizes in different ratios, followed by stacking layers of substrates as required to form three dimensional substrates, the thickness of a single layer of substrate is limited, and solvent is required to cohere various layers together so as to form interconnecting apertures. By doing so, it creates problems by closing part of the apertures in different layers as they dissolve in solvent. This is not a continuous process as required. Furthermore, stacking layers by hand is necessary, which further adds complexity to the process. In phase separation, patterning of voids is controlled by the arrangement of condensed crystals. However, the technology for controlling the types of condensed crystal, particle size, uniformity and arrangement are not fully developed, thus cannot be directly applied to produce porous polymer material.

For solvent-casting particulate leaching, the difficulty lies in producing three dimensional polymers, which is performed by introducing water solution into the material formed while precipitating polymer and leaching out salts. In prior art, pressure is utilized to introduce water solution into the material, thereby precipitating polymer and leaching out salt granules. However, pressure alone cannot properly introduce the solution into the polymer solution, which is present in liquid state as well. Therefore, in this case, polymer is not dissolved in organic solvents and is mixed with salt granules afterwards.

SUMMARY OF THE INVENTION

In order to overcome the above problems, an object of the invention is to provide a novel method for quickly producing multilayer porous polymer material having different apertures, porosities or that made from different materials. This method is an extension of Taiwanese Patent Application No. 90120067, dated Aug. 16, 2000. The principle of the invention is that a mixture of polymer and water-soluble particles in solid state is placed in a mold, followed by passing an organic solvent through the mixture, causing the polymer to soften, fix and form a continuous polymer with water-soluble particles dispersed within. Excess organic solvent is then drained out, followed by passing water solution to precipitate the polymer and dissolve the water-soluble particles thus forming voids within the polymer. Since polymer and water-soluble particles are mixed as solids, there is sufficient space present among particles that water solution can be introduced into the mixture. Also, more voids are formed by leaching out salt granules out of the polymer. By introducing a negative pressure in the mold, a great amount of water solution is introduced and flows through the material. Within the material, not only are voids formed after leaching out the water-soluble particles, gaps formed within the polymer and passages formed by leaching are also parts of the interconnecting voids formed in the three dimensional polymer structure. Consequently, porosity is greatly increased.

According to the principle described above, mixtures of polymer and water-soluble particles having different particle sizes are mixed in advance in different weight ratios. Medical ceramics, such as Hydroxyapatite (HAP) can be added as well. Based on various requirements, a mixture of the above material is placed into a mold sequentially to form a multi-layer polymer material.

It is another object of the invention to provide a method for quickly producing multi-layer porous polymer material having different apertures, porosities or made from different compositions.

In order to achieve the above objects, there is provided a method for producing a multi-layer porous polymer material, comprising: combining polymer composite and water-soluble material to form a mixture; placing the mixture into a mold; dissolving the surface of the polymer composite to cause cohesion; and introducing water into the inner part of the polymer composite so that water-soluble material is washed out of the mixture and the polymer composite is solidified.

In step (a), the polymer composite and water-soluble material are mixed as solids, and the mixing ratio depends on the required texture, porosity and aperture of the multi-layer porous polymer. In step (b), thickness of various layers of the multi-layer polymer is controlled by the amount of the mixture placed into the mold. The method for placing the mixture into the mold is not limited, for instance, they can be stacked layer by layer or in a concentric circle. Dissolving the surface of polymer to cause cohesion is done by adding an organic solvent to flow through the mixture.

Preferable polymer composite is comprised of at least one selected from polyglycolic acid (PGA), polylactic acid (PLA), poly(glycolide-co-lactide) acid (PLGA), polyanhydrides, polycaprolactone, polydioxanone and polyorthoester. Other inorganic material, such as HAP, tricalcium phosphate, dicalcium pyrophosphate, tetracalcium phosphate, octacalcium phosphate, or biomaterial, such as collagen and gelatin can be added as well. Forms of the polymer material are not limited, but preferably granular or fibrous. Particle size of the polymer is preferably 50–1000 $\mu$m.

Water-soluble material is preferably NaCl, KCl, KBr, $CaCl_2$, $MgCl_2$, poly(ethylene glycol), gelatin, glucose or sucrose.

Preferable solvents are 1,4-dioxane, acetone, chloroform, dichloromethane, tetrahydrofuran, N,N-dimethylformamide, ethylacetate, hexafluoroisopropanol, methylene chloride, hexafluoroacetone or sesquihydrate.

Suitable equipment for the invention is a mold with a depressurized filtration device. Other than that, an air-extracting depressurization apparatus for controlling pressure can be added as well.

According to the method provided in this invention, a multi-layer porous polymer material having different apertures, porosities or made from different material can be continuously produced. The final product is not only degradable/absorbable by subjects, it also presents voids in the polymer material that are interconnected, fully conforming to the requirements of biotechnology. The method is also very flexible such that various kinds of multi-layer porous polymer material having different textures, porosities or apertures can be produced by controlling the mixing ratio of polymer and water-soluble material, particle size of the water-soluble material, and thickness of various layers etc.

The present invention will become more fully understood from the detailed description given hereinbelow and the accompanying drawings, given by way of illustration only and thus not intended to be limitative of the present invention.

DETAILED DESCRIPTION OF THE INVENTION

EXAMPLE 1A

Multi-layer Polymer Material Having Two Layers of Different Apertures

Materials used included:

a. polymer material: PLGA prepared by ring-opening polymerization, which has a molecular weight of 200,000 measured by gel permeation chromatography. PLGA was crumbled in a grinder, followed by passing the granules through a 60–80 mesh to obtain granules having diameter between 177 and 250 $\mu$m.

b. Water-soluble material: Sodium chloride granules having different particle sizes were passed through a mesh to select diameter between 50 and 1000 $\mu$m.

c. Solvent: 1,4-dioxane

Figure 1:
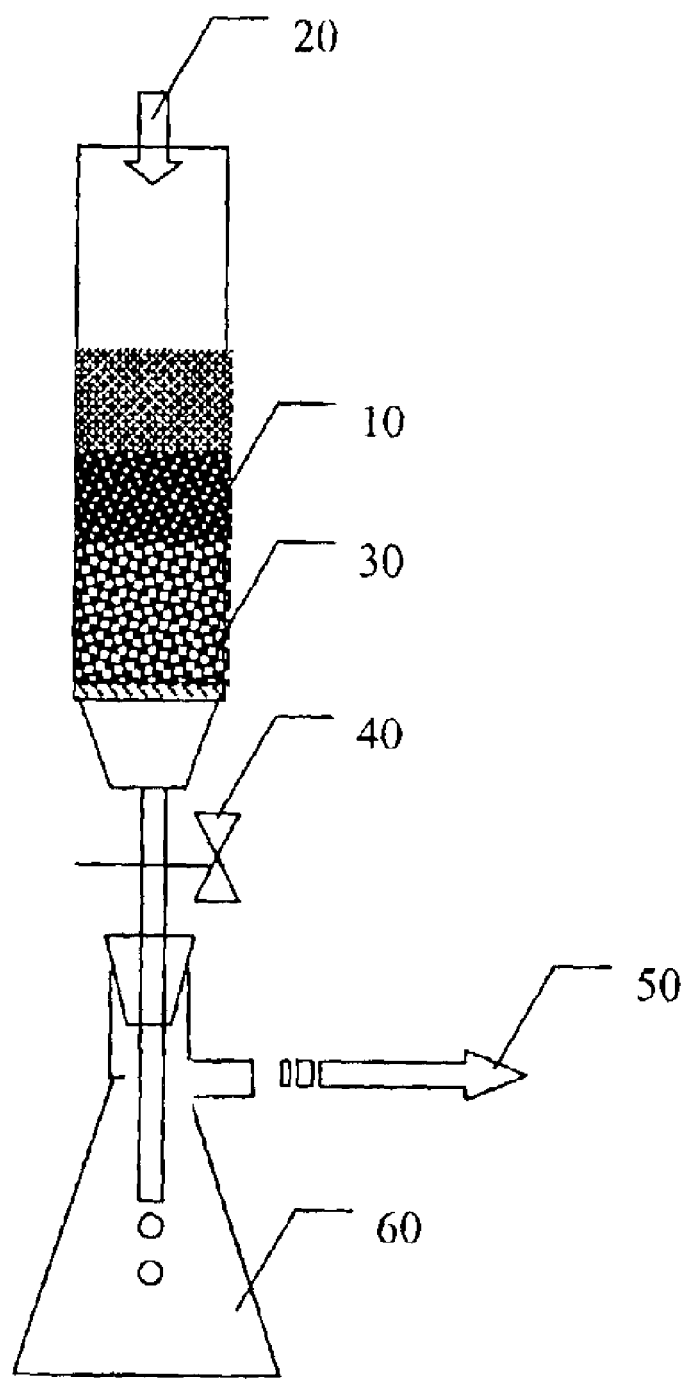
FIG. 1 is a graphical representation of the apparatus used in this invention to produce multi-layer porous polymer material.

Two types of sodium chloride granules (particle sizes of 177–250 $\mu$m and 53–88 $\mu$m) were separately mixed with PLGA polymer material to form two mixtures having weight ratios of PLGA/sodium chloride 10/90. Two mixtures were sequentially placed into a mold 10, shown in FIG. 1 and were pressed firmly. Next, organic solvent 20 was poured into the mold 10 to soak the mixture 30 to cause coherence of the polymer material within the mixture to form a multi-layer porous substrate. Using a vacuum pump 50, the gas valve 40 was then turned on to create a negative pressure, thereby draining excess solvent from the mold into a container 60.

Then, a non-solvent of PLGA was poured into the mold 10 to solidify partially-melted PLGA, followed by pouring in a large amount of deionized water. At the same time, the gas valve 40 was turned on to drain the water, which flowed through the material and further solidified PLGA. Sodium chloride granules were leached out simultaneously.

Next, the solidified porous multi-layer substrate was removed and placed in a beaker filled with deionized water. Deionized water was changed every six hours at room temperature. The substrate was dipped in the beaker and stirred at the same time for 24 hrs to wash out the remaining solvent and salts. It was then placed in a 50° C. vacuum oven to dry for another 24 hrs to obtain a final product of multi-layer porous substrate.

Small fragments were cut from the multi-layer porous substrate and used as samples for measuring aperture and porosity. Aperture was measured based on ASTM D-3576-94. Porosity was calculated by measuring length, width and height of samples to obtain their volumes, followed by measuring weight using microbalance. Density $\rho^*$ of the samples was calculated using the volume and weight obtained. Next, theoretical density $\rho$ (1.28 g/cm$^2$) of 85/15 PLGA was used to calculate porosity using the formula: porosity=$1-(\rho^*/\rho)$. Microstructure of the substrate was observed by electrical scanning microscope, with an operating current of 40 mA.

Figure 2A:
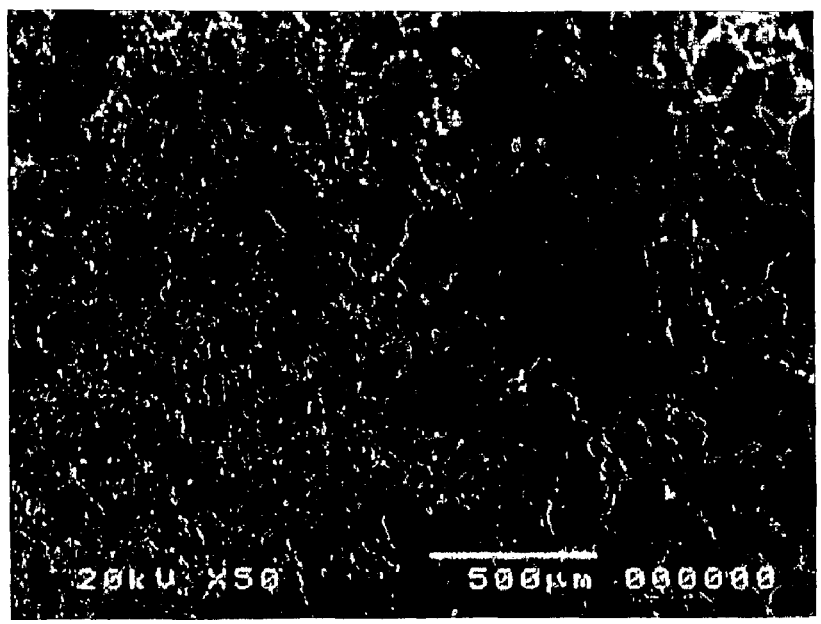
FIG. 2a illustrates the structure of the multi-layer porous polymer material obtained in Example 1A by electrical scanning microscope.
Figure 2B:
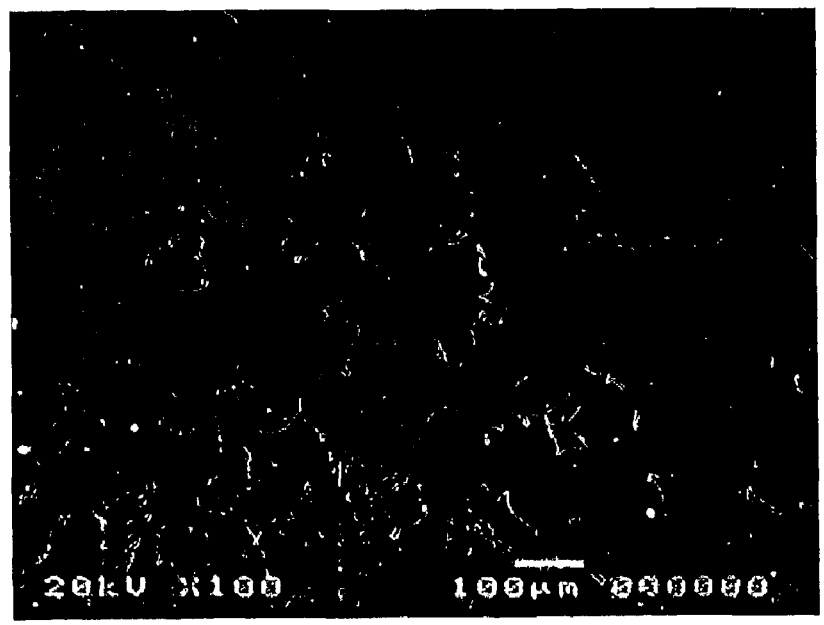
FIG. 2b illustrates the structure of the multiplayer porous polymer material obtained in Example 1A by electrical scanning microscope.

FIG. 2(*a*) illustrates the structure of the porous polymer material obtained by stacking two layers of PLGA with different particle sizes of sodium chloride (a layer of PLGA/sodium chloride (particle size 177–250 μm) and a layer of PLGA/sodium chloride (particle size 53–88 μm). It was observed that two layers having distribution of aperture diameter 109±36 μm and 69±26 μm respectively were formed. The result is in accordance with the particle sizes of sodium chloride, therefore apertures of individual layers can be adjusted by the sizes of water-soluble particles added. Thickness of different layers are also modifiable by the amount of PLGA/sodium chloride added.

FIG. 2(*b*) illustrates the structure of the interface of the layers of the porous polymer material obtained. A clear boundary between two layers was observed, and no discontinuous aperture or cut off were found. Two layers with different apertures having interconnected voids were obtained.

In order to show various kinds of multi-layer porous material having required apertures, porosities are produced by the method provided in this invention, the following examples 1B–1E were performed. However, the method of stacking and particle sizes of water-soluble granules varied from Example 1A, further described below.

EXAMPLE 1B

Three Layers of Sandwich Type Multi-layer Polymer Material Having Two Different Apertures Two types of sodium chloride granules (particle diameters of 177–250 μm and 53–88 μm) were separately mixed with PLGA polymer material to form two mixtures. The mixtures were stacked on one another in the sequence of 177–250 μm, 53–88 μm and 177–250 μm to form a three layered structure. The weight ratio of PLGA/sodium chloride were all 10/90. The same procedure as described in Example 1A was then followed to obtain a final product.

Figure 3:
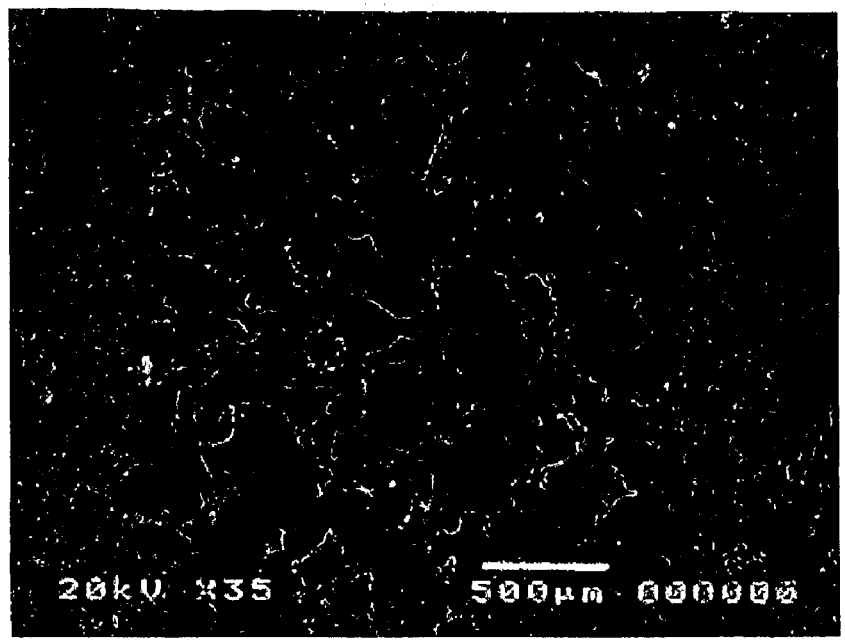
FIG. 3 the structure of the multi-layer porous polymer material obtained in Example 1B by electrical scanning microscope.

FIG. 3 illustrates the structure of the multi-layer porous polymer material (a layer of PLGA/sodium chloride (177–250 μm), a layer of PLGA/sodium chloride (53–88 μm), and a layer of PLGA/sodium chloride (177–250 μm)) obtained in this example. It is observed that the obtained structure is comprised of two layers having greater aperture with a layer having smaller aperture in the middle.

EXAMPLE 1C

Three Layers of Sandwich Type Multi-layer Polymer Material Having Two Different Apertures Two types of sodium chloride granules (particle diameters of 177–250 μm and 53–88 μm) were separately mixed with PLGA polymer material to form two mixtures. The mixtures were stacked on one another in the sequence of 53–88 μm, 177–250 μm and 53–88 μm to form a three layered structure. The weight ratio of PLGA/sodium chloride were all 10/90. The same procedure as described in Example 1A was followed to obtain a final product.

Figure 4:
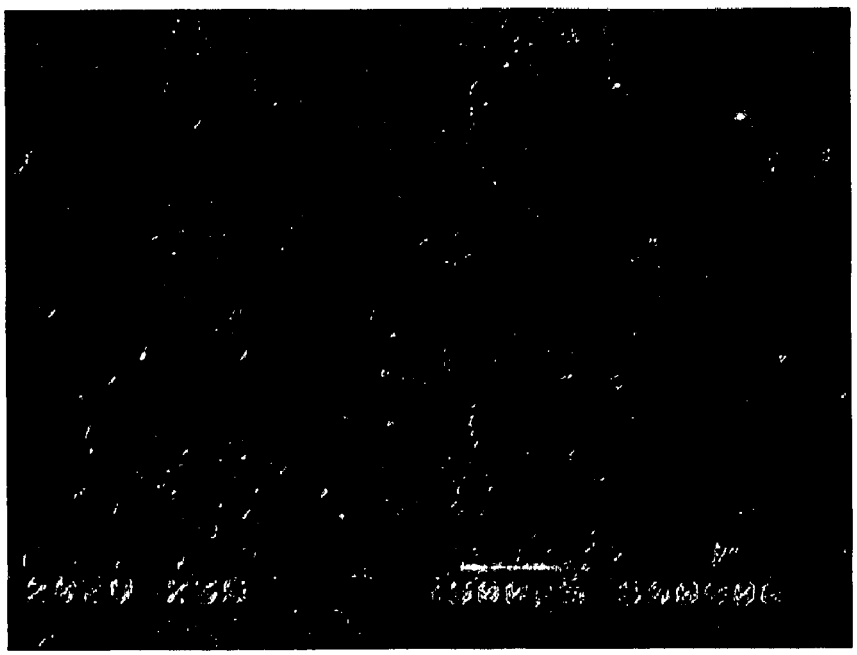
FIG. 4 the structure of the multi-layer porous polymer material obtained in Example 1C by electrical scanning microscope.

FIG. 4 illustrates the structure of the multi-layer porous polymer material (a layer of PLGA/sodium chloride (53–88 μm), a layer of PLGA/sodium chloride (177–250 μm), and a layer of PLGA/sodium chloride (53–88 μm)) obtained in this example. It is observed that the obtained structure is comprised of two layers having smaller apertures with a layer having greater aperture in the middle.

EXAMPLE 1D

Three Layers of Multi-layer Polymer Material Having Three Different Apertures

Three types of sodium chloride granules (particle sizes of 595–841 μm, 177–250 μm and 53–88 μm) were separately mixed with PLGA polymer material to form three mixtures. The mixtures were stacked on one another to form a three layered structure. The weight ratios of PLGA/sodium chloride were all 10/90. The same procedure as described in Example 1A was followed to obtain the final product.

Figure 5:
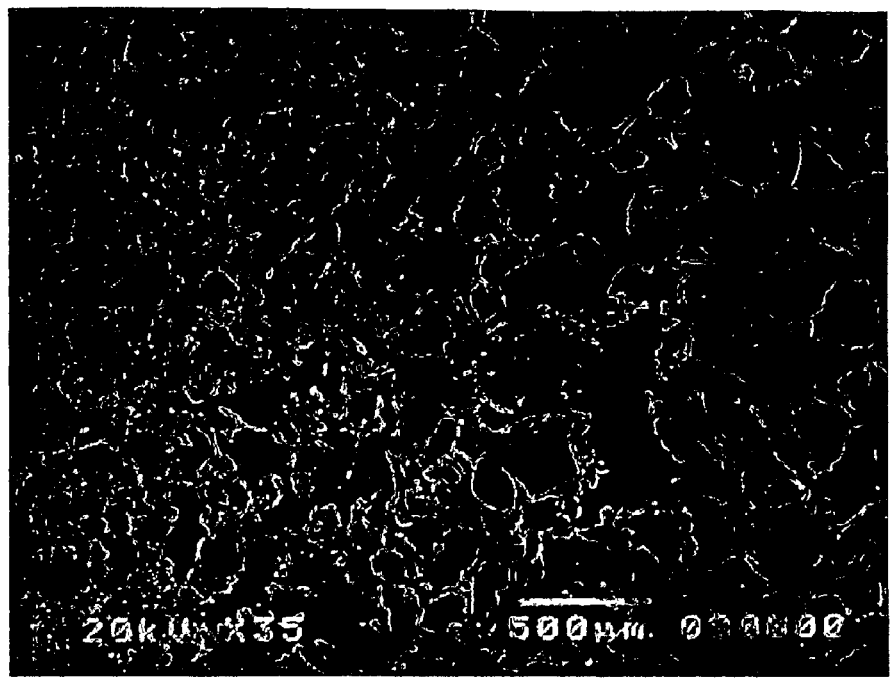
FIG. 5 the structure of the multi-layer porous polymer material obtained in Example 1D by electrical scanning microscope.

FIG. 5 illustrates the structure of the multi-layer porous polymer material obtained in this example. The aperture distribution is 653±43 μm; 215±187 μm; 59±23 μm, in accordance with the particle sizes of the sodium chloride used.

EXAMPLE 1E

Multi-layer Porous Polymer Material Having Different Aperture Arranged as a Concentric Circle Two types of sodium chloride granules (particle sizes of 177–250 μm and 53–88 μm) were separately mixed with PLGA polymer to form two mixtures, followed by placing them in the mold to form a concentric circle with the larger granules in the middle. Next, the same procedure as described in Example 1A was followed to obtain the final product.

Figure 6:
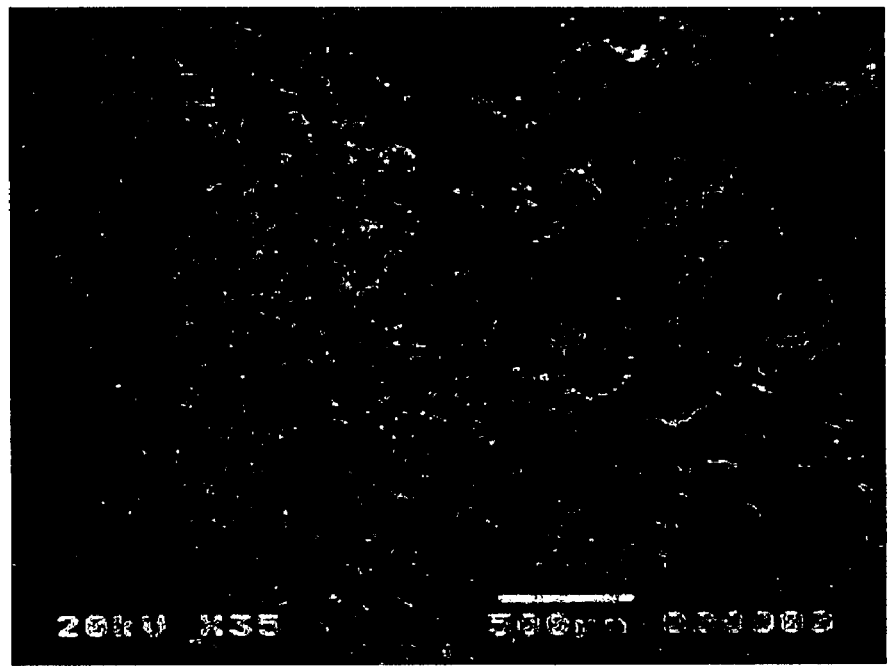
FIG. 6 the structure of the multi-layer porous polymer material obtained in Example 1E by electrical scanning microscope.

FIG. 6 is a graph showing the structure of the porous polymer material (sodium chloride 177–250 μm in the middle and 53–88 μm in the outer region) obtained in this example by electrical scanning microscope. Due to space limitation, FIG. 6 shows only a quarter of the concentric circle formed, with the top right corner being the center part of the concentric circle. It is observed that aperture on the top right corner is greater than that in the outer region, in accordance with the particle sizes of sodium chloride used. It is concluded that by using different stacking method, various forms of porous polymer material are obtainable using this invention.

EXAMPLE 2

Multi-layer Polymer Material Having Different Porosity

The Same procedure as described in Example 1A was followed, except the weight ratios of PLGA/sodium chloride (particle size: 177–250 μm) were 10/90 and 30/70.

Figure 7:
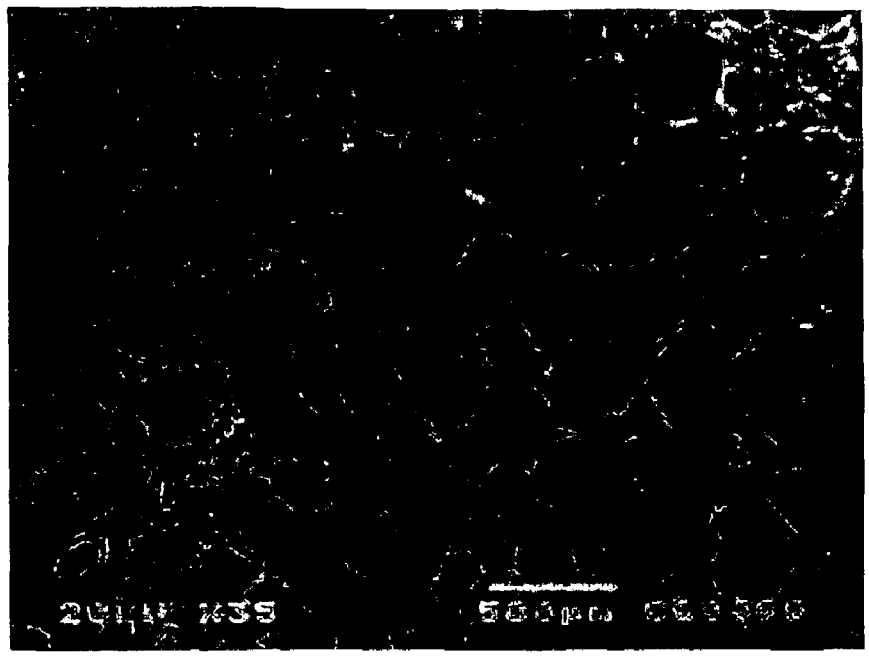
FIG. 7 the structure of the multi-layer porous polymer material obtained in Example 2 by electrical scanning microscope.

FIG. 7 illustrates the structure of the multi-layer porous polymer material obtained in this example, where the mixing ratios of PLGA/sodium chloride were 10/90 and 30/70. From the graph, it is observed that voids are sparsely distributed (porosity of 89.5±2.3%) on one side and voids on the other side are more densly arranged (porosity of 68.3±3.4%). The results show that porosity can be adjusted by varying the amount of water-soluble salts added. It is also noticed that voids are interconnected without cutting off or discontinuity.

EXAMPLE 3

Multi-layer Porous Polymer Material Prepared by Different Materials

Materials used included:
a. polymer material: PLGA prepared by ring-opening polymerization and hydroxyapatite (HAP) available from Merck Co were used. PLGA has a molecular weight of 200,000 measured by gel permeation chromatography. Composite of PLGA and HAP were heated to 110° C. in a mixer to obtain a PLGA/HAP bulk composite. Next, they were crumbled in a grinder, followed by passing the granules through a 60–80 mesh to obtain granules having particle size of 177–250 μm.
b. Water-soluble material: Sodium chloride granules having different diameters were passed through a mesh to select particle size of 50–1000 μm.
c. Solvent: 1,4-dioxane In this example, two mixtures of PLGA/sodium chloride (177–250 μm) and PLGA/HAP/sodium chloride (177–250 μm) were used. Weight ratios of PLGA/sodium chloride and PLGA/HAP/sodium chloride were both 10/90. The same procedure as described in Example 1A was used to obtain a multi-layer porous polymer material and test for aperture was performed. However, the test for porosity was performed according to J. Biomed. Mater. Res. 1997:35(1): 107–116 by Hsu et al.

Figure 8:
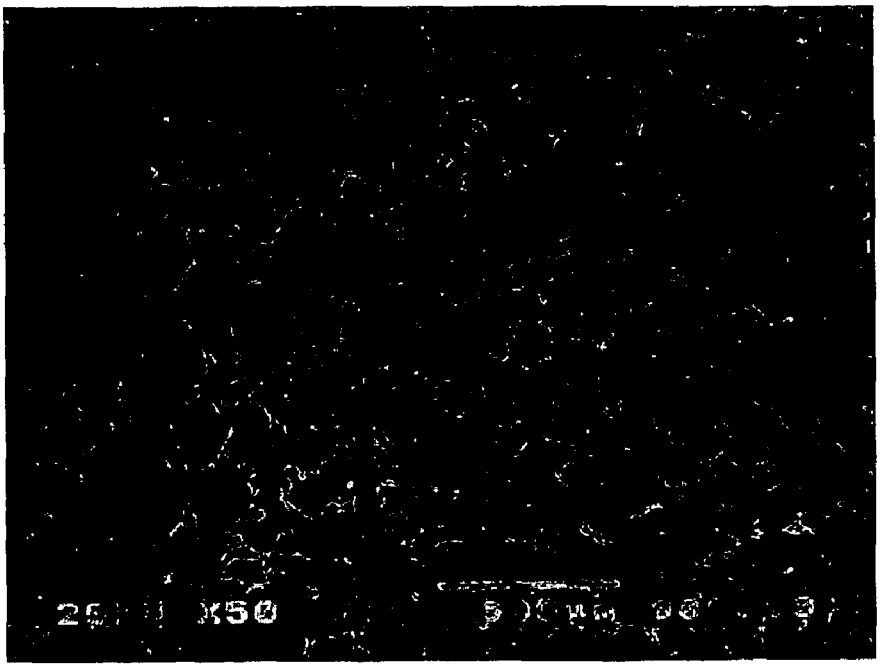
FIG. 8 the structure of the multi-layer porous polymer material obtained in Example 3 by electrical scanning microscope.

FIG. 8 illustrates the structure of the multi-layer porous polymer material obtained in this example. Judging from the graph, the interface between two layers of PLGA and PLGA/HAP is clearly observed, and the structure is more sparse, containing more voids in the PLGA/HAP region (porosity 90.2±4.1%), as ceramic powder was added. On the other side, where only PLGA was used, porosity is 88.3±1.9%. It is noticed that voids are interconnected without cutting off or discontinuity at the interface of the two layers, and the apertures and porosities for both sides are very close. This further illustrates that a porous polymer material having interconnecting voids is also obtainable using different polymer composite containing different materials. The method provided in this invention is applicable to obtain all sorts of porous polymer material having different porosities, apertures, even made from different polymer materials.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for producing porous polymer material, comprising:
   a. combining a polymer and water-soluble granules to form a mixture;
   b. placing the mixture into a mold;
   c. dissolving the surface of the polymer to cause cohesion and form a polymer structure; and
   d. introducing water into the inner part of the polymer structure so the water-soluble granules are washed out of the structure and the polymer is solidified.

2. The method as claimed in claim 1, wherein the mixing of the polymer and water-soluble granules in step (a) is combined in a solid state.

3. The method as claimed in claim 1, wherein the polymer and water-soluble granules are mixed in a ratio which depends on the requirements of texture, aperture and porosity of the porous polymer material.

4. The method as claimed in claim 1, wherein the amount of mixture placed in the mold of step (b) determines the thickness of various layers of the porous polymer material.

5. The method as claimed in claim 1, wherein the polymer is polyglycolide acid (PGA), polylactide acid (PLA), poly (glycolide co-lactide) acid (PLGA), polyanhydride, polycapralactone, polydioxanone or polyrthoester.

6. The method as claimed in claim 1, wherein the mixture also includes hydroxyapatite (HAP), tricalcium phosphate, dicalcium pyrophosphate, tetracalcium phosphate, octacalcium phosphate, collagen or gelatin.

7. The method as claimed in claim 5, wherein the polymer is granular or fibrous.

8. The method as claimed in claim 5, wherein the size of the polymer is 50–1000 μm.

9. The method as claimed in claim 1, wherein the water-soluble granules are NaCl, KCl, KBr, CaCl2, MgCl2, polyethylene glycol, gelatin, glucose or sucrose.

10. The method as claimed in claim 1, wherein a solvent is used in step (c) to dissolve the surface of the polymer, causing cohesion.

11. The method as claimed in claim 10, wherein the solvent is 1,4-dioxane, acetone, chloroform, dichloromethane, tetrahydrofuran, N,N-dimethylformamide, ethylacetate, hexafluoroisopropanol, methylene chloride, hexafluoroacetone or sesquihydrate.

12. The method as claimed in claim 1, wherein the mold allows depressurized filtration.

13. The method as claimed in claim 1, wherein the mold is equipped with a depressurized filtration device for pressure control.

14. The method as claimed in claim 1, wherein the mixture is stacked into the mold.

* * * * *